July 12, 1949.                G. E. DATH                2,475,661
              LOCKING CENTER PIN FOR RAILWAY CARS
                       Filed May 7, 1945
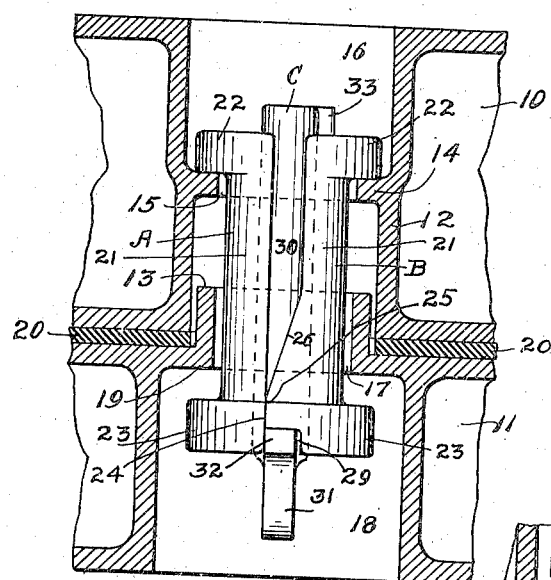
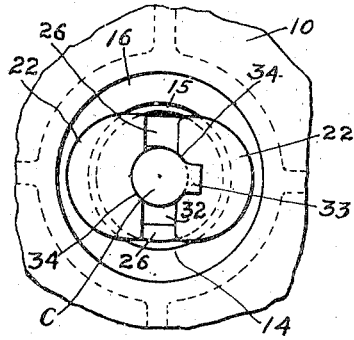
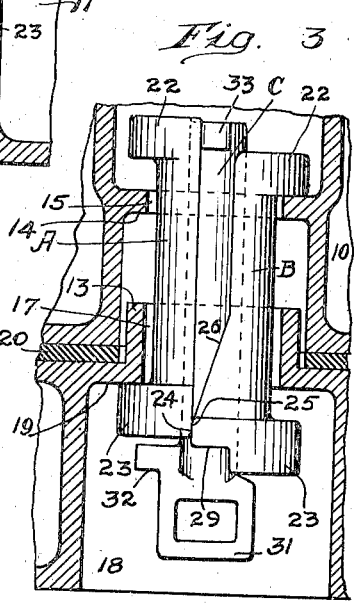
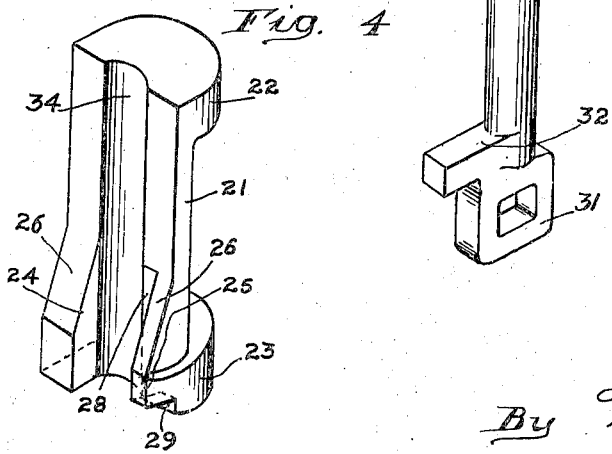
Inventor:
George E. Dath.
By Henry Fuchs
            Atty.

Patented July 12, 1949

2,475,661

UNITED STATES PATENT OFFICE 2,475,661

LOCKING CENTER PIN FOR RAILWAY CARS

George E. Dath, Mokena, Ill., assignor to W. H. Miner, Inc., Chicago, Ill., a corporation of Delaware Application May 7, 1945, Serial No. 592,479

8 Claims. (Cl. 105—200)

1

This invention relates to improvements in locking center pin for railway cars.

One object of the invention is to provide an improved car construction comprising a locking center pin for connecting the body and truck bolsters of a car and holding the bolsters against vertical separation, wherein the pin comprises two outer sections headed at opposite ends for shouldered engagement with the bolsters, and a filler element for holding the outer sections spread apart to maintain the shouldered engagement, the filler element being insertable lengthwise between the outer sections after the latter have been applied to the bolsters and being rotatable to bring the same in shouldered engagement with the outer sections, thereby locking the same against accidental removal from between said outer sections in lengthwise direction.

A further object of the invention is to provide a locking center pin as set forth in the preceding paragraph, wherein the filler element has a lug at its upper end engageable with the top end surface of one of said outer sections by partial rotation of said element, to hold said element against removal in downward direction, and wherein the filler element when applied is locked against rotary displacement with respect to the outer sections by shouldered engagement with the latter.

A more specific object of the invention is to provide a locking center pin comprising a pair of outer sections and a rotatable filler element for holding the outer sections separated, wherein the filler element has shouldered engagement with one of said outer sections to hold said element against downward displacement with respect to the outer sections, and is locked against rotation with respect to said outer sections by a locking projection on said element embraced between the lower end of the outer section with which it has shouldered engagement and the lower end of the other outer section, and wherein the weight of said other outer section is utilized to maintain the locking projection in said embraced relation.

Other objects of the invention will more clearly appear from the description and claims hereinafter following.

In the drawing forming a part of this specification, Figure 1 is a vertical sectional view, taken lengthwise through the mid portions of the body and truck bolsters of a railway car, illustrating my improvements in connection therewith, the locking center pin being shown in elevation. Figure 2 is a top plan view of Figure 1. Figure 3 is a view similar to Figure 1, partly broken

2 away, showing the parts of the locking center pin in different position and illustrating a step of the operation of assembling the parts of the pin. Figure 4 is a detail perspective view of one of the outer sections or members of the locking center pin, the section or member illustrated being that at the right hand side, as shown in Figure 1. Figure 5 is a detail perspective view of the filler element of my improved locking center pin.

In said drawing, 10 indicates the body bolster of the car and 11, the truck bolster. These bolsters are of usual well-known design, the body bolster being provided with a center section 12 to accommodate the center pin, and the truck bolster being provided with an upstanding hollow boss or flange 13, projecting into the section 12 of the body bolster. The section 12 is of substantially tubular form, having an inwardly projecting flange or rib 14 between the top and bottom ends thereof. The flange 14 defines an opening 15 adapted to accommodate the center pin. Above the flange 14, the section 12 forms a pocket 16 adapted to accommodate the head at the upper end of the pin. The annular hollow boss or upstanding flange 13 of the truck bolster 11 extends into the bottom portion of the opening of the section 12 of the body bolster, as most clearly shown in Figure 1. The hollow boss provides a circular opening 17 to accommodate the center pin. The opening 17 of the truck bolster and the opening 15 of the body bolster are in axial alignment. Below the opening 17, the truck bolster is provided with a pocket 18. The pocket 18 serves the purpose of accommodating the head at the bottom end of the center pin. As shown in Figure 1, the pocket 18 is of greater size than the opening 17 of the boss 13, thereby providing a downwardly facing shoulder 19 adjacent said opening, which cooperates with a head at the bottom end of the center pin to restrict upward movement of the latter. The usual bearing plate or shim 20 is interposed between the body and truck bolsters around the upwardly projecting boss 13 of the truck bolster.

My improved locking center pin comprises broadly a pair of outer members or sections A and B and a central spreader or filler element C.

The two outer members or sections A and B are of similar design, except as hereinafter pointed out. Each outer member comprises a substantially semi-cylindrical shank 21 having heads 22 and 23 at the top and bottom ends thereof. The top head 22 is in the form of an eccentric, substantially semi-cylindrical, outstanding flange, and the bottom head 23 is in the form of a concentric, substantially semi-cylindrical flange. The members A and B are laterally spaced apart at the upper ends and have contact with each other on their inner sides at their lower ends. The member B is laterally inwardly enlarged at its lower end, said laterally enlarged portion being in the form of spaced webs 24—25 to provide this contact. The zone of contact is on substantially flat, vertical faces, preferably of a vertical height at least as great as the thickness of the flange or head 23 of either of these members. Immediately above the zone of contact, each web 24 and 25 of the member B inclines away from the member A in upward direction, as indicated at 26. The web 25 is narrower than the web 24, being cut away at its inner side, as indicated at 28, to provide clearance for passage of the lug at the upper end of the filler element C, as hereinafter pointed out. The spaced arrangement of the upper end portions of the members A and B permits collapse of said upper end portions of the pin to make possible insertion and removal of said members.

The heads 22—22 at the upper end of the members A and B are made of such a size and contour that they will pass freely through the pin receiving openings 15 and 17 of the body and truck bolsters when these members are inserted or removed in succession from underneath the truck bolster, with the filler member absent so that the upper portion of the center pin may be collapsed.

The member B, which is the right hand outer member, as viewed in Figure 1, is transversely notched at its inner side at the lower end thereof, as indicated at 29, said notch being formed in the web portion 25 of said member B, said notch being defined by a horizontal top wall and a vertical side wall.

The filler element C comprises a cylindrical shank 30 and a headlike eye member 31 at the lower end of the shank. A radially projecting finger or lug 32 extends from the shank 30 at one side thereof, immediately above the eye member 31. The finger or lug 32 is of such a length that its outer end is flush with the outer edges of the heads 23—23 of the members A and B when the element C is in the position shown in Figures 1 and 2, and is of such a size that it completely fills the notch 29 of the member B, and abuts the vertical inner side of the member A at the lower end of the latter, thereby locking the filler element against rotation.

At the upper end thereof, the shank 30 of the element C is provided with a second radially projecting lug or finger 33, at substantially 90° to the lug 32. The lug 33 engages over the top end of the member B and is seated thereon as shown in Figures 1 and 2, to hold the element C against downward displacement.

The inner sides of the members A and B are centrally vertically slotted or grooved, as indicated at 34, the slot of the member B being located between the webs 24 and 25 thereof. These slots or grooves are of concave cross section and, when the members A and B of the pin are in assembled position, form a central bore in which the shank 30 of the element C fits loosely and is rotatable.

As will be seen upon reference to Figure 1, when the pin comprising the outer members A and B and the filler element C interposed between said members is applied to the bolsters, the shank of the pin substantially fits the openings 15 and 17 of the body and truck bolsters with the heads 22—22 and 23—23 disposed respectively above the shoulder presented by the flange or rib 14 of the body bolster, and below the shoulder 19 of the truck bolster. The pin is thus held against removal in both downward and upward directions.

In applying the center pin to the bolsters, the member A is first inserted through the openings of the bolsters from underneath the truck bolster and displaced laterally outwardly to overlap the heads 22 and 23 thereof with the shoulders of the bolsters. After this has been done, the member B is inserted from underneath the truck bolster, through the bolster openings alongside the member A. As will be evident, the inclined portions 26—26 of the webs 24 and 25 of the member B provide for the required clearance to permit inclining of this member to the proper extent to permit the head at the upper end to pass through the bolster opening. When the member B has been fully inserted, it will have been displaced laterally outwardly at its upper end by spreading apart of the lower end of the pin, to bring the head 22 thereof into shouldered engagement with the bolster 10, and, due to the fact that the members A and B have their inner side faces adjacent the lower end of the pin contacting, the head 23 at the lower end of the member B will be forced to engage beneath the shoulder of the truck bolster. The filler element C is next inserted between the members A and B from underneath the truck bolster to hold the members of the pin separated and in shouldered engagement with the body bolster. Before application of the element C, it is turned so that the lug or finger 33 thereof is in alignment with the opening between the members A and B and in registration with the recess provided by the cut away portion 28 of the web 25. In this position, the lug or finger 32 underlies the head at the lower end of the member B. Inasmuch as the finger 33, when in this position, is free to pass between the members A and B, the filler element may be shoved upwardly until the finger 33 is brought to a position above the level of the head at the upper end of the member B, as shown in Figure 3. While the filler element is thus being forced upwardly, the member A is lifted by engagement of the underlying finger 32 of the filler element with the underneath side of said member A. With the finger 33 thus positioned above the level of the top end of the member B, the element C is given a quarter turn, thereby bringing the finger or lug 33 into overlapping relation and shouldered engagement with the top end of the member B and seating the finger 32 in the notch 29 of said member, permitting the member A to drop to the position shown in Figure 1 with its inner side abutting the finger 32, thereby locking the filler element against rotation.

The element C is thus securely held against rotation with respect to the members A and B, thereby preventing the finger 33 from reaching a position of alignment with the opening between the members A and B and possible accidental dropping out of the element C from between said members.

In removing the center pin, the reverse procedure is followed. The member A is first pushed upwardly to lift the lower end thereof above the level of the finger 32. The element C is then given a quarter turn to align the finger 33 with the opening between the members A and B. The element C is then withdrawn from between the members A and B by pulling the same downwardly, a hook or similar tool being used for this purpose, the eye 31 serving as a convenient means for anchoring the hook. After withdrawal of the filler element, the outer members are removed in succession, the member B being the first withdrawn.

I claim:

1. In car construction, the combination with body and truck bolsters having aligned center pin receiving openings; of a center pin insertable from beneath said truck bolster, said pin including outer members headed at opposite ends and a filler element between said outer members rotatable with respect to said members, said filler element holding the pin expanded with the heads in shouldered engagement with the bolsters, said element having locking projections at the top and bottom ends thereof, said top locking projection being engaged over the upper end of one of said outer members by rotation of said element with respect to said members to hold said element against downward displacement, and said bottom locking projection being engaged between said outer members to hold said element against rotation.

2. In car construction, the combination with body and truck bolsters having aligned center pin receiving openings; of a center pin insertable from beneath said truck bolster, said pin including outer members headed at opposite ends and a filler element between said outer members, said filler element holding the pin expanded with the heads in shouldered engagement with the bolsters, said element being rotatable with respect to said outer members and having locking projections at the top and bottom ends thereof, circumferentially offset with respect to each other, said top locking projection being engaged over the upper end of one of said outer members by turning of said element with respect to said outer members to hold said element against downward displacement, and said bottom locking projection being engaged between said outer members to hold said element against rotation.

3. In car construction, the combination with body and truck bolsters having aligned center pin receiving openings; of a center pin insertable from beneath said truck bolster, said pin including outer members headed at opposite ends and a filler element between said outer members, said filler element being rotatable with respect to said outer members, said filler element holding the pin expanded with the heads in shouldered engagement with the bolsters, said element having a radial retaining lug at the upper end thereof engageable over the upper end of one of said outer members to support said element against downward displacement, said lug being of a size to pass between said members when the filler element is rotated to a position to align said lug with the opening between said members, said element having a second radial lug at the lower end thereof embraced between the lower end portions of said members to lock said filler element and outer members against relative rotation when the lug at the upper end of said element has been brought into overhanging supported relation with respect to the upper end of one of said outer members.

4. In car construction, the combination with body and truck bolsters having aligned center pin receiving openings; of a locking center pin insertable from beneath the truck bolster, said pin including elongated outer members having retaining flanges at opposite ends; a filler element between said members for holding the same spread apart with the flanges thereof in shouldered engagement with the bolsters, said filler element having a radially projecting lug at the upper end resting on and having shouldered engagement with the top end of one of said outer members; a notch at the lower end of said last named member at the inner side thereof; and a radially projecting finger at the lower end of said element in a diametrical plane at right angles to the plane of said lug and seated in said notch and held in said notch by engagement with the inner side of the other outer member to lock said filler element against rotation with respect to said outer members.

5. In a locking center pin of the character described, the combination with a pair of elongated outer members having retaining flanges at the top and bottom ends, one of the members of said pair having a vertical abutment surface at its lower end on the inner side thereof, and the other of said members having a seat at its lower end on the inner side having a flat vertical abutment wall facing said surface of the other member and a horizontal top wall; of an elongated central filler element between said outer members, said filler element being rotatable with respect to said outer members, having a radially projecting lug at its upper end and a second radially projecting lug at its lower end, said lug at the lower end being engaged in said seat underneath said top wall and embraced between said abutment surface and abutment wall to hold said element against upward displacement and rotation with respect to said outer members, the lug at the upper end of said element overhanging and being shouldered on the upper end of the member which is provided with the seat, to hold said element against downward displacement, said upper lug being brought into said overhanging position by rotation of said element with respect to said outer members.

6. In car construction, the combination with body and truck bolsters having aligned center pin receiving openings; of a center pin insertable in the openings of said bolsters, said pin including outer members headed at opposite ends and a rotatable filler element between said outer members holding said pin expanded with the heads in shouldered engagement with the bolsters, one of said outer members having a transverse abutment face at the lower end, said element having locking projections at the upper and lower ends thereof, said upper locking projection being engaged over the upper end of said last named outer member by turning said element with respect to the same, while the other of said outer members is lifted to clear said lower locking projection, said upper locking projection, when engaged over said member, holding said element against downward displacement, said lower locking projection being, by said turning of said element, shouldered against said abutment face to restrict upward displacement of said element, and being embraced between said outer members when said lifted member is lowered, thereby holding said element against rotation.

7. In car construction, the combination with body and truck bolsters having aligned center pin receiving openings; of a center pin insertable in said openings, said pin including outer members headed at opposite ends and a filler element rotatable with respect to said outer members, said filler element being disposed between said outer members for holding the pin expanded with its heads in shouldered engagement with the bolsters, one of said outer members having a downwardly facing shoulder on the inner side thereof, said element having locking projections at the top and bottom ends thereof, circumferentially offset with respect to each other, said top locking projection being engaged over the upper end of said last named member by turning of said element with respect to said outer member, while the other outer member is lifted to clear said bottom locking projection, said locking projection, when so engaged over said member, holding said element against downward displacement, and said bottom locking projection being engaged beneath said shoulder by said turning movement, and being embraced between said outer members when said lifted member is lowered to hold said element against rotation and upward displacement.

8. In car construction, the combination with body and truck bolsters having aligned center pin receiving openings; of a center pin insertable in said openings, said pin including a pair of outer members headed at opposite ends and a filler element between said outer members rotatable with respect to said members, said filler element having locking projections at opposite ends thereof engageable respectively over the top and bottom ends of one of said members by rotation of said element with respect to said member to lock said element against lengthwise displacement with respect to said outer members, the other outer member being movable to position to lock said element against rotation with respect to both of said outer members.

GEORGE E. DATH.

REFERENCES CITED

The following references are of record in the file of this patent:

UNITED STATES PATENTS

| Number | Name | Date |
|---|---|---|
| 1,764,444 | Haseltine | June 17, 1930 |
| 2,252,897 | Olander | Aug. 19, 1941 |